May 18, 1965                R. E. KLINE                3,184,246
                    STATIC FACE-TYPE FLOATING SEAL
Filed June 13, 1963                                2 Sheets-Sheet 1
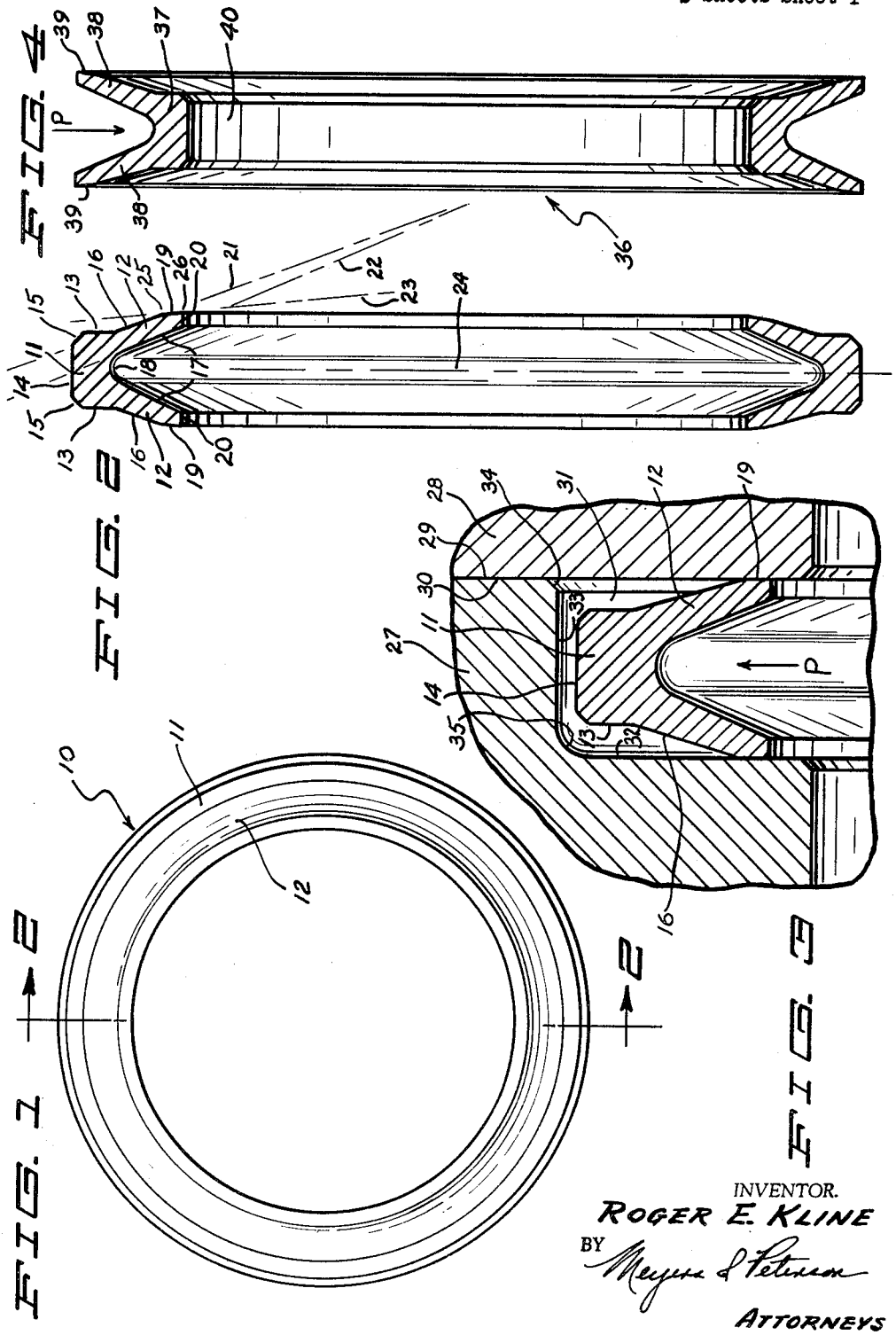
INVENTOR.
ROGER E. KLINE
BY
    ATTORNEYS

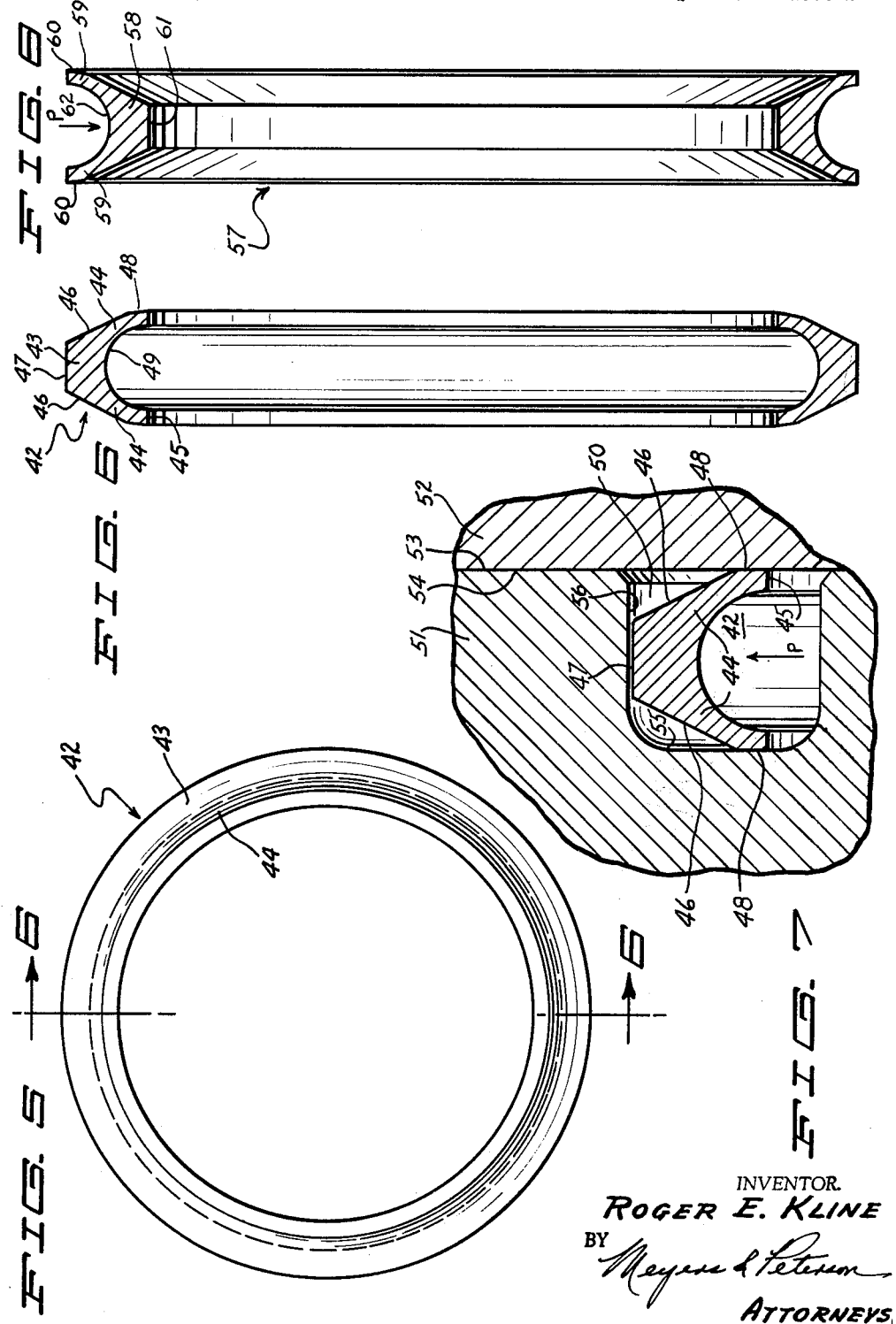

United States Patent Office 3,184,246
Patented May 18, 1965

3,184,246
STATIC FACE-TYPE FLOATING SEAL
Roger E. Kline, Costa Mesa, Calif., assignor, by mesne assignments, to Aerospace Components Corporation, Los Angeles, Calif., a corporation of California
Filed June 13, 1963, Ser. No. 287,699
1 Claim. (Cl. 277—168)

This invention relates to fluid sealing and more particularly to a static face-type seal having the capability of adapting itself to aberrations in the surfaces to be sealed and to strains under extreme variations in pressure and temperature.

Reference is made to United States Patent application Serial Number 797,744, filed May 28, 1960, and now abandoned, in which I was co-inventor. In the prior invention there set forth, the hoop or body portion is designed to provide a stop or spacer for abutting the surfaces of elements to be sealed. Such abutment is desirable in that it assures against rolling or twisting of the ring under high fluid pressures exerted against the seal. Further, the angle of the seal legs and the shouldered sealing surface are predetermined in accordance with the spacer width and the spring preload exerted by the elements to be sealed against the legs. The aforementioned seal performs admirably under a narrow range of pressures and so long as the seal dimensions are held to extremely close tolerances and the elements present virtually no aberration at the sealing surfaces.

The present invention is concerned with a seal which is not gripped or abutted through any stop or spacer element, but rather is a floating pressure structure. It is therefore within the contemplation of the present invention and a general object thereof to provide a highly efficient floating seal where the sole areas of pressure are at the sealing surfaces themselves. More specifically, it is an object of the invention to provide a static seal, which can conform to aberrations in the surfaces in elements to be sealed, of such a character which heretofore would be considered defective and unsealable under comparable conditions of high fluid pressures and temperatures.

A further object of the invention is to provide a unitary seal wherein the sealing legs and the hoop or body portion thereof combine to effect compensating flexure for local variations and undulations in surfaces to be sealed, yet do not require a high degree of perfection with respect to the dimensions thereof and can utilize a relatively small volume of material with respect to the area to be sealed.

A further object of the invention is to provide a seal which will present substantially flat contact surfaces under distortion at a wide range of pressures or temperatures.

Another object of the invention is to provide a static seal of the type described which will not take a permanent set and will not become marred or ruptured. In other words, the seal is capable of reuse between the same or similar elements to be sealed and under the same or widely differing physical conditions.

Yet another object of the invention is to provide a seal system wherein a floating seal can distort sufficiently to follow aberrations in the sealing surfaces, but is restrained from twisting to the extent of breaking the seal under stringent conditions.

A still further object of the invention is to provide a seal system which can utilize a floating seal made in accordance with the present invention in a conventional O-ring groove and in other grooves having radius fillets without wedging or cocking thereagainst.

These and other objects and advantages of my invention will more fully appear from the following description, made in connection with the accompanying drawings, wherein like reference characters refer to the same or similar parts throughout the several views in which:

FIGURE 1 is a side elevation of a sealing ring made in accordance with the invention;

FIGURE 2 is an enlarged cross-sectional view of the ring taken on the line 2—2 of FIG. 1;

FIGURE 3 is a further enlarged cross-sectional view of the ring as it lies in a groove between elements to be sealed;

FIGURE 4 is an alternate form of the ring shown in FIG. 1 adapted to resist external pressures;

FIGURE 5 is a side elevation of another form of the invention;

FIGURE 6 is an enlarged cross-sectional view taken on the line 6—6 of FIG. 5;

FIGURE 7 is a further enlarged cross-sectional view of the ring shown in FIG. 5 and fitted into an ordinary O-ring groove; and FIGURE 8 is an alternate form of the ring shown in FIG. 5 adapted to resist external pressures.

With continued reference to the drawings my static sealing device is illustrated in circular form in FIG. 1 and generally assigned the numeral 10. Device 10 is unitary in construction and may be made of any suitable material having strength and resilience compatible with the type of fluid to be contained and with the pressures and temperatures to which the fluid will be subjected.

The main elements of the device comprise a body or hoop portion 11 and spaced resilient leg or flange portions 12. It should be noted that the hoop portion 11 is thicker than the flange portions 12 and hence the bending or distortion of the flange portions 12 will be greater than that of the hoop 11 when the same amount of stress is applied to each.

Referring now to FIG. 2, it will be noted that hoop portion 11 has substantially parallel sidewalls 13 and an outer circumferential surface 14. The junctures between the surfaces 13 and 14 are chamfered at 15 and this chamfer has been found to promote the general flexing of the device while minimizing fracturing or rupturing of the sealing device. Also the chamfered corners assure free clearance of the sealing device when mounted in a groove system as will be subsequently set forth.

Extending divergently and generally in a radial direction from the hoop portion 11 are the two flange portions 12 as previously noted. Each of the flanges 12 has an outer surface 16 and an inner surface 17. These surfaces 16 and 17 define in cross-section (as viewed in FIG. 2) a continuous taper from the hoop 11 to the outer ends of the flanges. Outer surfaces 16 join with the side surfaces 13 of the hoop portion 11. Inner surfaces 17 merge in a smooth curve 18 which also defines the inner circumferential surface of the hoop portion 11 in the form illustrated in FIG. 2.

An important feature of the invention resides in the sealing surface 19 which constitutes a portion of the outer surfaces 16 and lies respectively adjacent the free end 20 of each of the flange portions 12.

It will be observed that the extended plane 21 of the outer surface 16 intersects the extended plane 22 of the inner surface 17 to provide the desired tapering effect. Also, it will be noted that the sealing surface 19 lies in a plane 23 which defines a lesser angle with the general plane 24 of the entire device. The angle of the sealing surfaces 19, however, still remain positive and the heel 25 of each flange lies slightly inward from the outermost corner 26 of each of the flanges 12. The foregoing remarks have been made with respect to the static sealing device of FIGS. 1 and 2 when in its relaxed condition.

Referring now to FIG. 3, a sealed assemblage is set forth wherein fluid pressure is exerted in the direction of the arrow. Generally stated, the sealed assemblage has a pair of elements 27 and 28 with respective confronting surfaces 29 and 30 to be sealed against escape of pressurized fluid. A groove system 31 is formed between the two elements 27 and 28 and may be formed in one of the elements or in both as is common in the art. In the particular showing in FIG. 3, the groove system 31 is cut into the element 27 and comprises a wall 32 generally parallel to wall 30 and a circumferential wall 33 extending outwardly to the surface 30 and terminating in a chamfered corner 34 as shown. A corner fillet 35 may be formed between the walls 32 and 33 as is common in the art.

In practicing the invention the elements 27 and 28 are drawn together and the confronting surfaces 29 and 30 may or may not contact each other. It is important, however, that the sealing surface 19 of each of the legs or flanges 12 lie flat or substantially so against the surface 30 of the element 28. In the case of low pressure fluids the elements 27 and 28 will be drawn up so that the static pressure of the elements themselves will cause the sealing surfaces 19 to assume a flat relation with respect to the surface 30. Since the flanges 12 are tapered, a cantilever effect is obtained by the compressive force and each of the legs will slightly bend so as to conform the sealing surface 19 to the confronting surface 30. In the event of high pressure fluids, which are sufficient in and of themselves to cause a flexing of the flanges 12, the grooved width is so adjusted that a slight positive angle is initially formed between the confronting surfaces 30 and 32 and when the maximum fluid pressure is applied the surfaces will ultimately assume their substantially flat relation with respect to the said surfaces.

Another important feature of the invention is the koating character of the device in the sealed assemblage. The only portion of the sealing device which lies under compressive force is the sealing surface itself. There is a small clearance in the groove system 31 with the remaining portions of the outer surfaces 16, the hoop surfaces 13 and the circumferential surface 14 as clearly shown in FIG. 3. The sealing device is so dimensioned that the clearances will not permit the hoop to roll over or twist within the groove system. Within the limits of the clearance, however, the device may undulate and flex considerably. It will be further noted that there are no ribs or protuberances which will constitute a rigidifying influence. Thus, the hoop 11 may itself flex to some degree and the flange portions 12 may flex even more and yet will retain a substantially flat sealing contact with the confronting surfaces of a groove system.

Referring now to FIG. 4, a ring or hoop type sealing device is shown having all of the essential features of the sealing device illustrated in FIGS. 1 and 2. The device of FIG. 4, however, is designated generally at 36 and is designed to resist pressure externally applied in the direction of the arrow as opposed to the internally applied pressures of the first mentioned sealing device. In the static sealing device 36 the hoop portion 37 has radially outward extending legs or flanges 38 of the same tapered structure and terminating in sealing surfaces 39 as shown. Surface 40 constitutes the inner circumference and surface 41 the outer. In its use in a groove system (not shown) a groove will be cut similar to that of groove 31 in FIG. 3 such that the arcuate curvature is in the opposite direction.

Referring now to FIG. 5, I there show a sealing device generally denoted at 42. A sealing device 42 has the same essential elements as the first mentioned form of the invention, mainly the hoop portion 43 and the leg or flanges 44 which are tapered outwardly to their ends 45 as shown. In the sealing device 42, however, the outer surfaces 46 extend in a plane from the outer circumferential surface 47 of the hoop 43 in a plane directly joining with the sealing surfaces 48. The same angular relationship of the surfaces, however, apply as described in connection with FIG. 2. In the sealing device 42, however, the inner surface 49 constitutes a continuous arc which provides both the inner surface of the legs or flanges 44 and the inner circumference of the hoop 43. When the sealing device 42 is placed in a groove system 50 as shown in FIG. 7, the elements 51 and 52 will be sealed at their respectively confronting faces 53 and 54. The groove system 50 provides the actual contacting surfaces 55 against which one leg 44 is pressed, the other leg 44 being pressed against the surface 54. The groove system 50 is of the type generally employed for conventional O-rings, yet, my sealing device may be employed therewith. It will be noted that similar clearances are established between the flange outer surfaces 46 and the surfaces 55 and 53 of the groove system. Also a small clearance exists between the circumferential surface 47 and the groove wall 56. Sealing surfaces 48 again are caused to assume a substantially flat sealing engagement with the confronting surfaces 55 and 53. The depth of the sealing device 42 from the outer circumference to the ends of the flanges 44 is not greater than the width of the device from sealing surface 48 on the one flange to that of the other. It is thus possible to employ a high pressure static seal in accordance with the present invention in the conventional O-ring groove and yet maintain the clearances and floating character previously mentioned.

As in the sealing device of FIG. 4, it is also possible to provide a sealing device 57 having a hoop portion 58, legs or flanges 59 and sealing surfaces 60 so constructed and arranged to provide a seal against fluid pressure applied externally in the direction of the arrow. Here again it will be noted that the hoop surface 61 lies at the inner circumference of the sealing device while the arcuate surface 62 becomes the external circumference of the hoop. The groove system (not shown) for the sealing device 57 will be a conventional O-ring type groove with an arcuate curvature reversed from that of the groove system 50 in FIG. 7.

In summary, the essential features of all of the forms of the invention herein disclosed cooperate to produce a floating seal and makes possible high fidelity performance without precise measurements. In fact, the floating seal of the present invention is capable of following aberrations and undulations in a sealed assemblage which would normally be considered defective or even inoperative.

It will, of course, be understood that various changes may be made in the form, details, arrangements and proportions of the parts without departing from the scope of my invention as set forth in the appended claim.

What is claimed is:

A sealed assemblage for retaining fluids under a wide range of pressures which comprises:

(a) a pair of elements to be sealed having confronting surfaces, (b) a groove system cooperatively formed between said confronting surfaces, (c) a sealing device having a hoop portion lying in floating clearance with the walls of said groove system, (d) a pair of resilient flanges integral with and cantilevered divergently and generally in a radial direction from the hoop portion, (e) said flanges each having an outer and an inner surface defining in cross-section a continuous taper to the ends thereof, (f) and a sealing surface forming a portion of said outer surface adjacent the end of each flange, and being angulated to a lesser degree than the remaining portion of said outer surface with respect to the general plane of the sealing device, (g) said flanges lying under resilient compression between said confronting surfaces and said sealing surfaces lying respectively in substantially flat engagement therewith.

(Other references on following page)

References Cited by the Examiner

UNITED STATES PATENTS

| | | | |
|---|---|---|---|
| 254,736 | 3/82 | Van Tine. | |
| 2,282,363 | 5/42 | King | 277—205 |
| 2,420,929 | 5/47 | Buffington et al. | 277—205 |
| 3,090,630 | 5/63 | Gasche | 277—206 |

FOREIGN PATENTS

| | | |
|---|---|---|
| 488,775 | 11/18 | France. |
| 1,173,682 | 10/58 | France. |
| 849,803 | 9/60 | Great Britain. |

LEWIS J. LEENY, *Primary Examiner.*

EDWARD V. BENHAM, *Examiner.*